US011514699B2

(12) United States Patent
Yuan et al.

(10) Patent No.: US 11,514,699 B2
(45) Date of Patent: Nov. 29, 2022

(54) TEXT BLOCK RECOGNITION BASED ON DISCRETE CHARACTER RECOGNITION AND TEXT INFORMATION CONNECTIVITY

(71) Applicant: International Business Machines Corporation, Armonk, NY (US)

(72) Inventors: Zhong Fang Yuan, Xi'an (CN); Zhuo Cai, Beijing (CN); Tong Liu, Xi'an (CN); Yu Pan, Shanghai (CN); Li Ni Zhang, Beijing (CN); Jian Long Li, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 16/942,852

(22) Filed: Jul. 30, 2020

(65) Prior Publication Data

US 2022/0036062 A1    Feb. 3, 2022

(51) Int. Cl.
*G06K 9/36* (2006.01)
*G06V 30/413* (2022.01)
*G06V 10/40* (2022.01)
*G06V 30/262* (2022.01)
*G06V 30/10* (2022.01)

(52) U.S. Cl.
CPC ............ *G06V 30/413* (2022.01); *G06V 10/40* (2022.01); *G06V 30/274* (2022.01); *G06V 30/10* (2022.01)

(58) Field of Classification Search
CPC .... G06V 30/413; G06V 10/40; G06V 30/274; G06V 30/10; G06V 30/412
See application file for complete search history.

(56) References Cited

U.S. PATENT DOCUMENTS

| 5,737,442 A * | 4/1998 | Alam ................. G06V 30/1444 |
| | | 382/175 |
| 10,068,155 B2 * | 9/2018 | Kalyuzhny ............ G06V 30/40 |
| 10,963,692 B1 * | 3/2021 | Corcoran ............. G06V 30/414 |
| 2010/0174975 A1 * | 7/2010 | Mansfield ............. G06F 40/174 |
| | | 707/E17.058 |
| 2013/0325770 A1 * | 12/2013 | Heidasch ............. G06F 16/367 |
| | | 706/20 |

(Continued)

FOREIGN PATENT DOCUMENTS

| CN | 109948149 A | * | 6/2019 | |
| CN | 110738030 A | * | 1/2020 | |
| CN | 113158987 A | * | 7/2021 | ........... G06F 40/177 |

OTHER PUBLICATIONS

T-Recs Table Recognition and Validation approach, Thomas G. Kieninger et al., AAAI, 1999, pp. 50-57 (Year: 1999).*

(Continued)

*Primary Examiner* — Jayesh A Patel
(74) *Attorney, Agent, or Firm* — Edward J. Wixted, III

(57) ABSTRACT

In an approach for a text block recognition in a document, a processor detects characters in the document using an object detection technique. A processor identifies positions of the detected characters in the document. A processor analyzes semantic connectivity among the detected characters based on the positions and semantic connectivity of the characters. A processor recognizes text blocks of related characters based on the semantic connectivity analysis. A processor outputs the text blocks associated with the related characters.

17 Claims, 6 Drawing Sheets

(56) References Cited

U.S. PATENT DOCUMENTS

| | | | | |
|---|---|---|---|---|
| 2014/0369602 A1* | 12/2014 | Meier | ................. | G06V 30/412 |
| | | | | 382/182 |
| 2015/0339278 A1* | 11/2015 | Bao | ...................... | G06F 40/137 |
| | | | | 715/229 |
| 2019/0340240 A1* | 11/2019 | Duta | ...................... | G06V 30/15 |
| 2020/0074169 A1* | 3/2020 | Mukhopadhyay | ..... | G06Q 50/18 |
| 2020/0125898 A1* | 4/2020 | Zuev | ................... | G06V 10/426 |
| 2020/0167558 A1* | 5/2020 | Yang | ................... | G06V 30/413 |

OTHER PUBLICATIONS

Recognition of Tables and Forms, Bertrand Cotiasnon et al., HAL, Nov. 25, 2014, pp. 646-677 (Year: 2014).*

Image-based logical document structure recognition, Grzegorz Kamola et al., Springer, 2015, pp. 651-665 (Year: 2015).*

The T-Recs Table Recognition and Analysis System, Thomas Kieningeretal, Springer, 1999, pp. 255-270 (Year: 1999).*

Couasnon et al., "Recognition of Tables and Forms", Handbook of Document Image Processing and Recognition, Nov. 25, 2014, 32 pages, <https://hal.inria.fr/hal-01087230/document>.

Kieninger et al., "T-Recs Table Recognition and Validation Approach", AAAI Technical Report FS-99-04, © 1999, 8 pages, <https://www.aaai.org/Papers/Symposia/Fall/1999/FS-99-04/FS99-04-007.pdf>.

* cited by examiner

TEXT BLOCK RECOGNITION BASED ON DISCRETE CHARACTER RECOGNITION AND TEXT INFORMATION CONNECTIVITY

BACKGROUND

The present disclosure relates generally to the field of object recognition, and more particularly to text block recognition and table reconstruction from a document.

Object recognition is a technology in the field of computer vision for finding and identifying objects in an image or video sequence. Optical character recognition may be an electronic or mechanical conversion of images of typed, handwritten or printed text into machine-encoded text, whether from a scanned document, a photo of a document, a scene-photo or from subtitle text superimposed on an image. A table may be an arrangement of data in rows and columns, or possibly in a more complex structure. Tables may be widely used in communication, research, and data analysis. Tables may appear in print media, handwritten notes, computer software, architectural ornamentation, traffic signs, and many other places. The precise conventions and terminology for describing tables may vary depending on the context. Tables may differ significantly in variety, structure, flexibility, notation, representation and use.

SUMMARY

Aspects of an embodiment of the present disclosure disclose an approach for a text block recognition in a document. A processor detects characters in the document using an object detection technique. A processor identifies positions of the detected characters in the document. A processor analyzes semantic connectivity among the detected characters based on the positions and semantic connectivity of the characters. A processor recognizes text blocks of related characters based on the semantic connectivity analysis. A processor outputs the text blocks associated with the related characters.

DETAILED DESCRIPTION

The present disclosure is directed to systems and methods for table text block recognition and table reconstruction from a document.

Embodiments of the present disclosure recognize a need to improve recognition accuracy of form or table content. For example, a recognition method may use computer vision to identify border lines or intersections of the lines in a table document. The detected lines may be used to divide the table into cells. The recognition method may be used for the text in the cells. Embodiments of the present disclosure recognize the recognition method may heavily rely on cell segmentation and that accuracy may not be guaranteed. In addition, embodiments of the present disclosure recognize a need to restore content of a table when the text in the table is vertical. Further, embodiments of the present disclosure recognize a need to accurately identify content in a table without border lines or with inconspicuous border lines.

Embodiments of the present disclosure disclose systems and methods based on discrete character recognition and using semantic connectivity to organize discrete characters into meaningful content in a table document. Embodiments of the present disclosure disclose recognizing content and positions of the characters in the document. In an example, the document can be a scanned document, an image file, a word document, or any other suitable document. For example, the document can be a tabular document. The characters may be letters, strings, symbols, or other suitable type of characters. In some examples, a character can be a word. In an example, embodiments of the present disclosure disclose recognize related characters based on the positions and semantic connectivity of the characters in an information entropy method. In another example, text block recognition module 110 may recognize related characters based on the positions and semantic connectivity of the characters using a pre-trained language model. The pre-trained language model, for example, may be bidirectional encoder representations from transformers (BERT) that is a neural network-based technique for natural language processing pre-training. In one or more embodiments, embodiments of the present disclosure disclose reconstructing a table based on the coordinate positions of the text blocks of the detected characters in the document, and outputting the text blocks in a table format, for example, in an eXtensible Markup Language (XML), comma-separated values (CSV), or another suitable format file.

Figure 1:
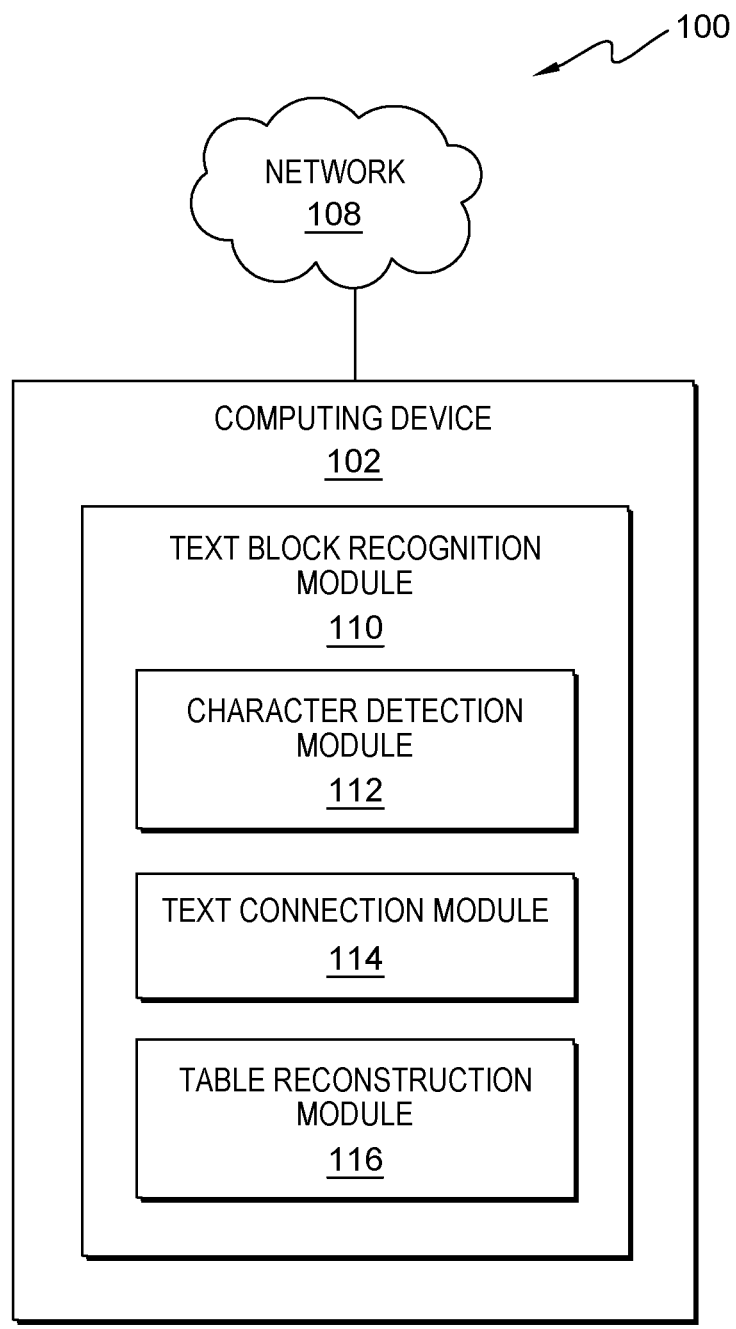
FIG. 1 is a functional block diagram illustrating a text block recognition environment, in accordance with an embodiment of the present disclosure.

The present disclosure will now be described in detail with reference to the Figures. FIG. 1 is a functional block diagram illustrating text block recognition environment, generally designated 100, in accordance with an embodiment of the present disclosure.

In the depicted embodiment, text block recognition environment 100 includes computing device 102 and network 108. In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to text block recognition module 110 and network 108 and is capable of processing program instructions and executing text block recognition module 110, in accordance with an embodiment of the present disclosure.

Figure 6:
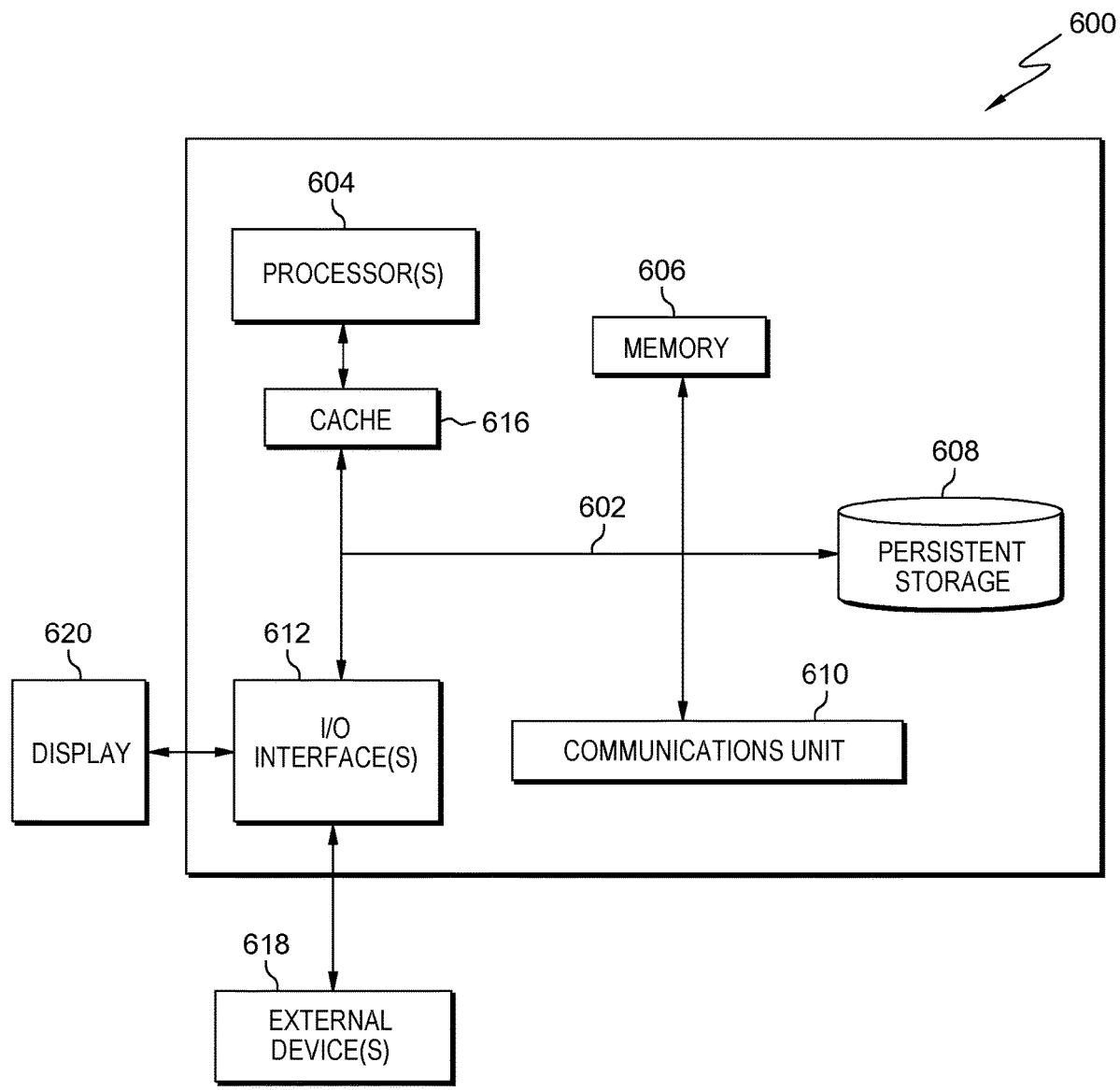
FIG. 6 is a block diagram of components of the computing device of FIG. 1, in accordance with an embodiment of the present disclosure.

Computing device 102 may include internal and external hardware components, as depicted and described in further detail with respect to FIG. 6.

Further, in the depicted embodiment, computing device 102 includes text block recognition module 110. In the depicted embodiment, text block recognition module 110 is located on computing device 102. However, in other embodiments, text block recognition module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and text block recognition module 110, in accordance with a desired embodiment of the disclosure.

In the depicted embodiment, text block recognition module 110 includes character detection module 112, text connection module 114, and table reconstruction module 116. In the depicted embodiment, character detection module 112, text connection module 114, and table reconstruction module 116 are located on text block recognition module 110 and computing device 102. However, in other embodiments, character detection module 112, text connection module 114, and table reconstruction module 116 may be located externally and accessed through a communication network such as network 108.

In one or more embodiments, text block recognition module 110 is configured to detect characters in a document. Text block recognition module 110 may recognize content and positions of the characters. Text block recognition module 110 may recognize content and positions of each detected character. In an example, the document can be a scanned document, an image file, a word document, or any other suitable document. For example, the document can be a document including a table. The characters may be letters, strings, symbols, or other suitable type of characters. In some examples, a character can be a word. In other examples, a character can be a single letter and multiple characters can become a word. In an example, text block recognition module 110 may use an object recognition technology for detecting the characters and identifying the corresponding positions of the characters in the document. Each corresponding position of each character can be represented in coordinates, for example, in a format of (x1, y1, x2, y2). In an example, coordinates (x1, y1, x2, y2) may represent left-top and right-bottom points to label the position of the detected character. In an example, text block recognition module 110 may use an optical character recognition technology for detecting the characters and identifying each position of each character in the document. Text block recognition module 110 may recognize content of the characters. In an example, text block recognition module 110 may apply natural language processing techniques to recognize content of the characters. A natural language processing technique may include natural language classifying, natural language understanding, optical character recognition, and any other natural language processing techniques with analyzing, understanding, and generating natural human languages.

In one or more embodiments, text block recognition module 110 is configured to analyze connection relationship among the detected characters in the document. Text block recognition module 110 may recognize related characters based on the positions and semantic connectivity of the characters using an information entropy method. In another example, text block recognition module 110 may recognize the related characters based on the positions and semantic connectivity of the characters using a pre-trained language model, for example, BERT. Text block recognition module 110 may perform connectivity detection of the characters in multiple directions of each character. For example, text block recognition module 110 may take a detected character as a starting point and perform connectivity detection with neighbor characters in multiple directions, for example, up, down, left, and right. Text block recognition module 110 may calculate an information entropy gain rate based on a base corpus and may select one with a highest possibility of the connectivity among the four directions. Text block recognition module 110 may view the detected character and the selected character together as a new text block. Text block recognition module 110 may repeat the connection detection until all the discrete characters in the document are connected as one of large-grained text information blocks. Text block recognition module 110 may calculate connection probability of text blocks which can be words, sentences, or other suitable text block formats. Text block recognition module 110 may integrate various text blocks, retain content and text coordinates, and prepare for table reconstruction.

In one or more embodiments, text block recognition module 110 is configured to output recognized text blocks associated with the related characters in a table format. After the discrete characters in the document are connected as large-grained text blocks, text block recognition module 110 may reconstruct a table based on the coordinate positions of the text blocks. Text block recognition module 110 may find corresponding neighboring texts with left-right relationship and up-down relationship. Text block recognition module 110 may merge the neighboring text blocks. Text block recognition module 110 may perform left and right merge and or up and down merge. Text block recognition module 110 may perform the left and right merge based on the maximum and minimum values of multiple text blocks on the y-axis. Text block recognition module 110 may perform the up and down merge based on the maximum and minimum values of multiple text blocks on the x-axis. Text block recognition module 110 may output the characters in text blocks in a table format, for example, in an XML, CSV, or other suitable format file.

In the depicted embodiment, text block recognition module 110 includes character detection module 112, text connection module 114, and table reconstruction module 116. In one or more embodiments, character detection module 112 is configured to detect characters from a document. Character detection module 112 may recognize content and positions of each detected character. In an example, the document can be a scanned document, an image file, a word document, or any other suitable document. For example, the document can be a scanned tabular document. The characters may be letters, strings, symbols, or other suitable types of characters. In some examples, a character can be a word. In other examples, a character can be a single letter and multiple characters can become a word. In an example, character detection module 112 may use object recognition technology for detecting the characters and identifying the corresponding positions of the characters in the document. Each corresponding position of each character can be represented in coordinates, for example, in a format of (x1, y1, x2, y2). In an example, coordinates (x1, y1, x2, y2) may represent left-top and right-bottom points to label the position of the detected character. In an example, character detection module 112 may use optical character recognition technology for detecting the characters and identifying each position of each character in the document. In another example, character detection module 112 may apply natural language processing techniques to recognize content of the characters.

In one or more embodiments, text connection module 114 is configured to analyze semantic connectivity among the detected characters based on the positions and semantic connectivity of the characters. Text connection module 114 may analyze connection relationship among the detected characters in the document. Text connection module 114 may recognize related characters based on the positions and semantic connectivity of the characters. Text block recognition module 110 may recognize text blocks of related characters based on the semantic connectivity analysis. In an example, text connection module 114 may recognize related characters in an information entropy method. For example, text block recognition module 110 may take a detected character as a starting point and perform connectivity detection with neighbor characters in four directions: up, down, left, and right. Text connection module 114 may calculate the information entropy gain rate based on a base corpus and select one with a highest possibility of the connectivity with the detected character among the four directions. Text connection module 114 may put the detected character and the selected character together as a new text block and may calculate an information entropy gain rate based on the new text block with new neighbor characters in four directions: up, down, left, and right. Text connection module 114 may select a next character with the highest possibility among the four directions for the new text block with the next character. Text connection module 110 may repeat the connection detection until all the discrete characters in the document are connected as large-grained text information blocks. Text connection module 110 may calculate the possibility that two text areas are connected, for example, character units in the early connection period and text block units in the later connection period which may be a word, a sentence, a paragraph, or other suitable text block format. Text connection module 110 may integrate various text blocks, retain content and text block coordinates, and prepare for table reconstruction in table construction module 116. In another example, text block recognition module 110 may recognize related characters based on the positions and semantic connectivity of the characters using a pre-trained language model. Text block recognition module 110 may perform connectivity detection of the characters in multiple directions of each character. Text block recognition module 110 may calculate the information entropy gain rate based on a base corpus and select one with a highest possibility of the connectivity among the multiple directions.

In one or more embodiments, table reconstruction module 116 is configured to reconstruct a table including content of the detected characters from character detection module 112 and text connection module 114. After all the discrete characters in the document are connected as large-grained text information blocks, table reconstruction module 116 may output the detected characters and may reconstruct a table based on the coordinate positions of the text information blocks. Table reconstruction module 116 may detect corresponding neighboring texts with left-right relationship and up-down relationship. Table reconstruction module 116 may merge the neighboring text blocks. Table reconstruction module 116 may perform left and right merge and up and down merge. Table reconstruction module 116 may perform the left and right merge based on the maximum and minimum values of multiple text blocks on the y-axis. Text block recognition module 110 may perform the up and down merge based on the maximum and minimum values of multiple text blocks on the x-axis. Text block recognition module 110 may output the characters in text blocks in a table format, for example, in an XML, CSV, or another suitable table format file.

Figure 2:
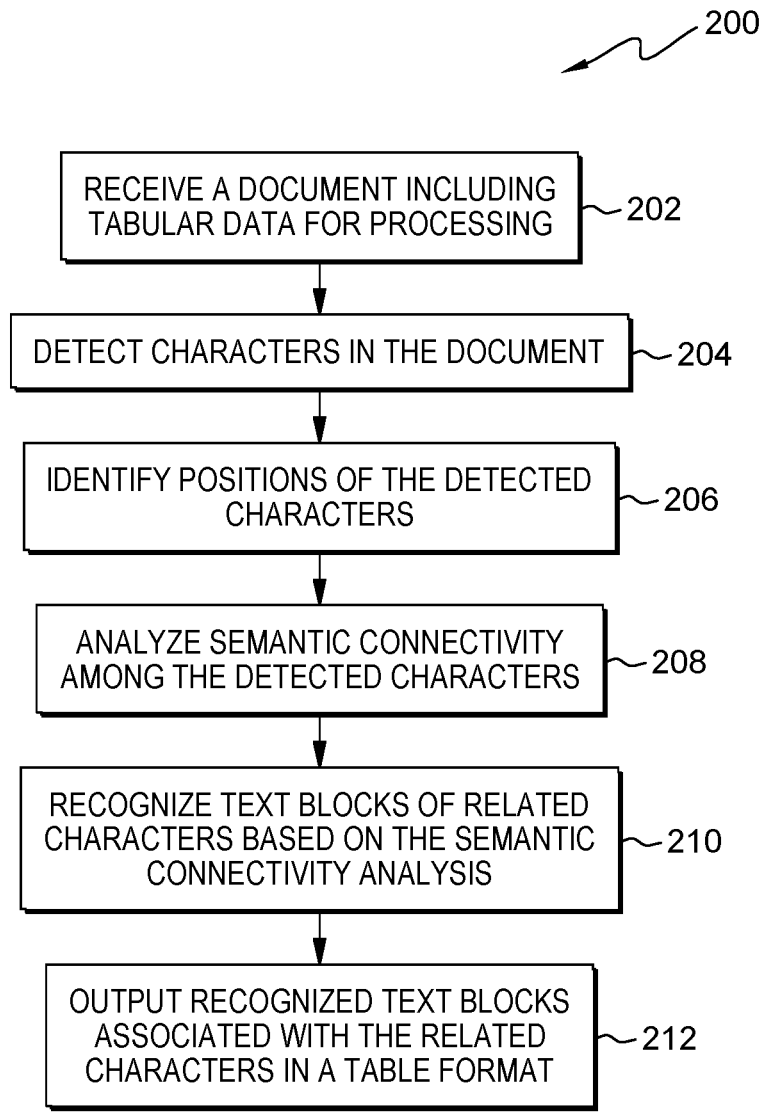
FIG. 2 is a flowchart depicting operational steps of a text block recognition module within a computing device of FIG. 1, in accordance with an embodiment of the present disclosure.

FIG. 2 is a flowchart 200 depicting operational steps of text block recognition module 110 in accordance with an embodiment of the present disclosure.

Text block recognition module 110 operates to receive a document including tabular data for processing. Text block recognition module 110 also operates to detect characters in the document using an object detection technique. Text block recognition module 110 operates to identify positions of the detected characters. Text block recognition module 110 operates to analyze semantic connectivity among the detected characters based on the positions and semantic connectivity of the characters. Text block recognition module 110 operates to recognize text blocks of related characters based on the semantic connectivity analysis. Text block recognition module 110 operates to output recognized text blocks associated with the related characters in a table format.

In step 202, text block recognition module 110 receives a document including tabular data for processing. In an example, the document can be a scanned document, an image file, a word document, or any other suitable document. For example, the document can be a scanned tabular document. Tabular data may be image data or character data, such as a word or a string composed of a combination of letters, numbers and/or symbols.

In step 204, text block recognition module 110 detects characters in the document. The characters may be letters, strings, symbols, or other suitable type of characters. In some examples, a character can be a word. In other examples, a character can be a single letter and multiple characters can become a word. In an example, character detection module 112 may use an object detection technique for detecting the characters. For example, character detection module 112 may use an optical character recognition technique for detecting the characters. In another example, character detection module 112 may apply a natural language processing technique to recognize content of the characters.

In step 206, text block recognition module 110 identifies positions of the detected characters. Each corresponding position of each character can be represented in coordinates, for example, in a format of (x1, y1, x2, y2). In an example, coordinates (x1, y1, x2, y2) may represent left-top and right-bottom points to label the position of the detected character. In an example, character detection module 112 may use optical character recognition technology for detecting the characters and identifying each position of each character in the document.

In step 208, text block recognition module 110 analyzes semantic connectivity among the detected characters based on the positions and semantic connectivity of the characters. Text block recognition module 110 may take a detected character as a starting point to analyze semantic connectivity among the detected characters. In an example, text connection module 114 may analyze semantic connectivity among the detected characters based on an information entropy method. In another example, text block recognition module 110 may analyze semantic connectivity among the detected characters using a pre-trained language model. For example, text block recognition module 110 may take a detected character as a starting point and perform connectivity detection with neighbor characters in four directions: up, down, left, and right. Text block recognition module 110 may calculate an information entropy gain rate based on a base corpus and may select one with a highest probability of the connectivity with the detected character among the four directions. Text block recognition module 110 may consider the detected character and the selected character together as a new character unit (or called as a new text block) and calculate an information entropy gain rate based on the new character unit with new neighbor characters in four directions: up, down, left, and right. Text block recognition module 110 may select a next character with the highest probability among the four directions for the new character unit with the next character.

In step 210, text block recognition module 110 recognizes text blocks of related characters based on the semantic connectivity analysis in step 208. Text block recognition module 110 may repeat the connectivity detection in step 208 until all the discrete characters in the document are associated in one of text blocks. Text block recognition module 110 may calculate the probability that two text blocks are connected, for example, character units in the early connectivity detection period and text block units in the later connectivity detection period, which may be a word, a sentence, a paragraph, or other suitable text blocks. Text block recognition module 110 may integrate various text blocks, retain content and text block coordinates, and prepare for table reconstruction in table construction module 116.

In step 212, text block recognition module 110 outputs recognized text blocks associated with a group of the related characters in a table format. Text block recognition module 110 may reconstruct a table including content of the detected characters from character detection module 112 and text connection module 114. After all the discrete characters in the document are connected as large-grained text blocks, text block recognition module 110 may output the detected characters and may reconstruct a table based on the coordinate positions of the text blocks. Text block recognition module 110 may detect corresponding neighboring texts with left-right relationship and up-down relationship. Text block recognition module 110 may merge the neighboring text blocks. Text block recognition module 110 may perform left and right merge and up and down merge. Text block recognition module 110 may perform the left and right merge based on the maximum and minimum values of multiple text blocks on the y-axis. Text block recognition module 110 may perform the up and down merge based on the maximum and minimum values of multiple text blocks on the x-axis. Text block recognition module 110 may output the characters in text blocks in a table format, for example, in an XML, CSV, or another suitable table format file.

Figure 3:
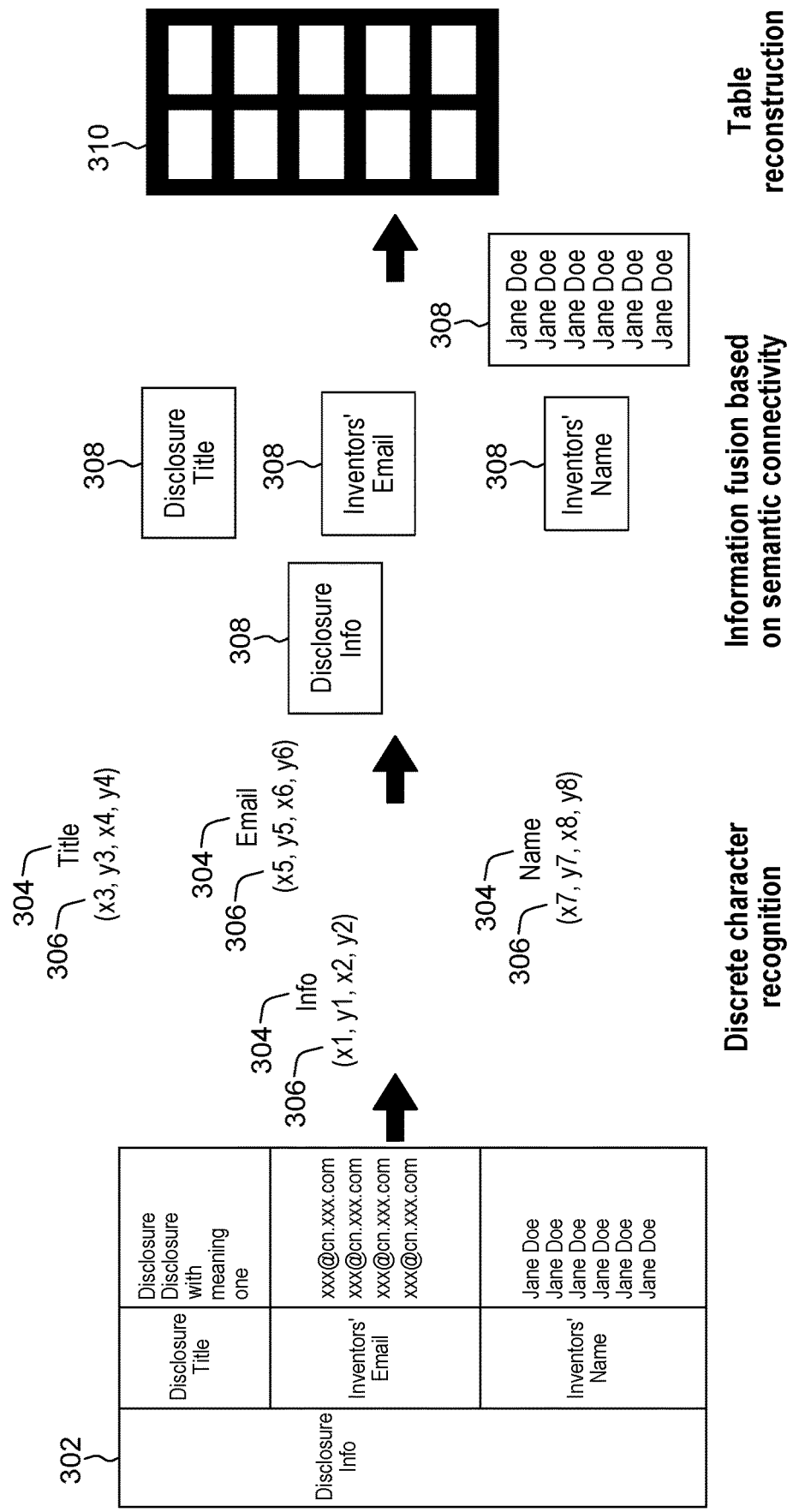
FIG. 3 illustrates an example process of the text block recognition module within the computing device of FIG. 1, in accordance with an embodiment of the present disclosure.

FIG. 3 illustrates an example process of text block recognition module 110 within computing device 102, in accordance with an embodiment of the present disclosure.

In the example process of FIG. 3, text block recognition module 110 receives example document 302 including tabular data for processing. Text block recognition module 110 detects characters 304 in document 302. For the purpose of illustration, text block recognition module 110 detects characters 304 including words such as "Info", "Title", "Email", "Name". In other examples, text block recognition module 110 may detect characters 304 in other suitable format, for example, letters, strings, symbols, or other suitable type of characters. Text block recognition module 110 may identify positions of the detected characters 304. Each corresponding position of each character 304 can be represented in coordinates 306. In an example, coordinates 306 may represent left-top and right-bottom points to label the position of the detected character 304. Text block recognition module 110 may analyze semantic connectivity based on the positions and semantic connectivity of characters 304. In an example, text connection module 114 may analyze semantic connectivity among the detected characters 304 based on an information entropy method. In another example, text block recognition module 110 may analyze semantic connectivity among the detected characters using a pre-trained language model, for example, BERT. Text block recognition module 110 may recognize text blocks 308 of related characters based on the semantic connectivity analysis. Text block recognition module 110 may output recognized text blocks 308 associated with a group of the related characters 304. Text block recognition module 110 may reconstruct table 310 based on the coordinate positions of text blocks 308. Text block recognition module 110 may output text blocks 308 in a table format, for example, in an XML, CSV, or another suitable table format file.

Figure 4:
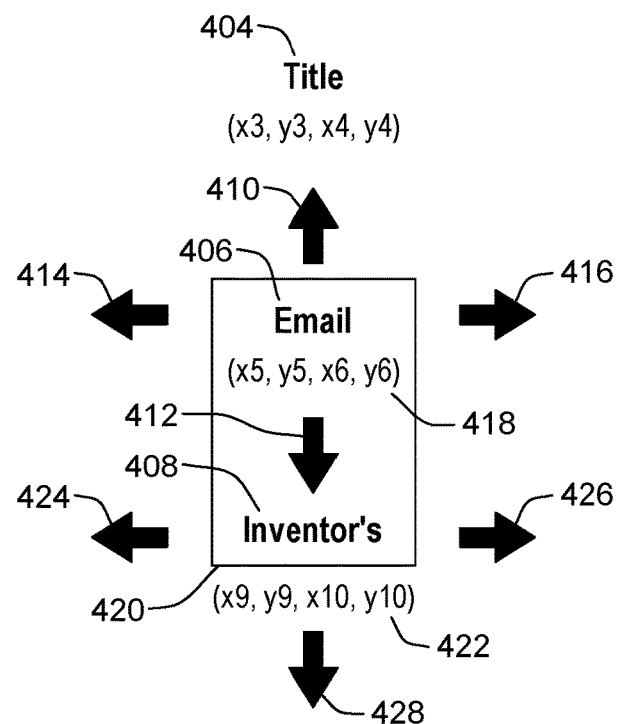
FIG. 4 illustrates another example process of the text block recognition module within the computing device of FIG. 1, in accordance with an embodiment of the present disclosure.

FIG. 4 illustrates another example process of text block recognition module 110 within computing device 102, in accordance with an embodiment of the present disclosure.

In the example process of FIG. 4, text block recognition module 110 detects character "Email" 406 in document 302. Text block recognition module 110 identifies the position of character "Email" 406 as coordinates (x5, y5, x6, y6) 418. For the purpose of example illustration, text block recognition module 110 may take character "Email" 406 as a starting point to analyze semantic connectivity among the characters in document 302. Text block recognition module 110 may perform connectivity detection with neighbor characters for character "Email" 406 in multiple directions: up 410, down 412, left 414, and right 416. Text block recognition module 110 may calculate an information entropy gain rate based on a base corpus and may select one with a highest probability of the connectivity with "Email" 406 among the four directions. For example, the character in up 410 direction is "Title" 404 and the character in down 412 direction is "Inventor's" 408". In the example, the one with the highest probability of the connectivity with "Email" 406 is determined as "Inventor's" 408. Text block recognition module 110 may put both "Email" 406 and "Inventor's" 408 together to form text block 420 with corresponding coordinates (x9, y9, x10, y10) 422. Corresponding coordinates (x9, y9, x10, y10) 422 indicate the position of text block 420. Text block recognition module 110 may continue to perform connectivity detection with neighbor characters for text block 420 in multiple directions, for example, down 428, left 424, and right 426. Text block recognition module 110 may repeat the connectivity detection until all characters in document 302 are associated in one of text blocks.

Figure 5:
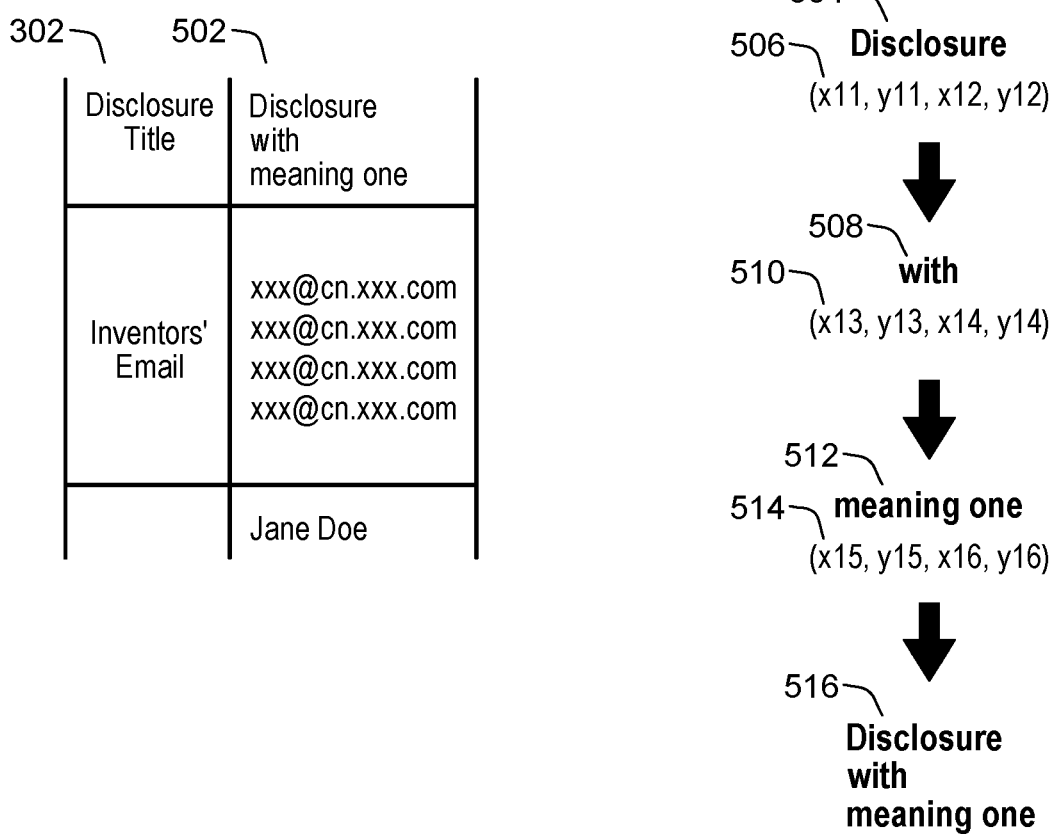
FIG. 5 illustrates another example process of the text block recognition module within the computing device of FIG. 1, in accordance with an embodiment of the present disclosure.

FIG. 5 illustrates another example process of text block recognition module 110 within computing device 102, in accordance with an embodiment of the present disclosure.

In the example process of FIG. 5, text block recognition module 110 detects "Disclosure" 504 in block 502 of document 302. Text block recognition module 110 identifies the position of "Disclosure" 504 as coordinates (x11, y11, x12, y12) 506. Text block recognition module 110 may take "Disclosure" 504 as a starting point to analyze semantic connectivity among the characters in document 302. Text block recognition module 110 may perform connectivity detection with neighbor characters for "Disclosure" 504 in multiple directions, e.g., up, down, left, and right. Text block recognition module 110 detects "with" 508 and identifies the corresponding position (x13, y13, x14, y14) 510 of "with" 508. Text block recognition module 110 detects "meaning one" 512 and identifies the corresponding position (x15, y15, x16, y16) 514 of "meaning one" 512. Text block recognition module 110 may integrate text blocks 504, 508, 512 into large text block 516, retain content and text block coordinates, and prepare for table reconstruction in table construction module 116.

FIG. 6 depicts a block diagram 600 of components of computing device 102 in accordance with an illustrative embodiment of the present disclosure. It should be appreciated that FIG. 6 provides only an illustration of one implementation and does not imply any limitations with regard to the environments in which different embodiments may be implemented. Many modifications to the depicted environment may be made.

Computing device 102 may include communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Text block recognition module 110 may be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Text block recognition module 110 may be downloaded to persistent storage 608 through communications unit 610.

I/O interface(s) 612 allows for input and output of data with other devices that may be connected to computing device 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., Text block recognition module 110 can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   detecting, by one or more processors, characters in a document using an object detection technique;
   identifying, by one or more processors, positions of the detected characters in the document;
   calculating, by one or more processors, probability of character units to be connected;
   determining, by one or more processors, semantic connectivity based on the calculated probability;
   analyzing, by one or more processors, the semantic connectivity among the detected characters based on the positions and semantic connectivity of the characters;
   recognizing, by one or more processors, text blocks of related characters based on the semantic connectivity analysis; and
   outputting, by one or more processors, the text blocks associated with the related characters.

2. The computer-implemented method of claim 1, further comprising:
   receiving, by one or more processors, the document, including tabular data, for processing, the document being a scanned document.

3. The computer-implemented method of claim 1, wherein detecting the characters includes recognizing content of the detected characters.

4. The computer-implemented method of claim 1, wherein analyzing the semantic connectivity includes taking a detected character as a starting point and performing connectivity detection in multiple directions, the connectivity detection being based on a base corpus calculating information entropy gain rate of the connecting characters.

5. The computer-implemented method of claim 1, wherein recognizing the text blocks includes performing text content connection based on probability of the content connection of the related characters.

6. The computer-implemented method of claim 1, wherein outputting the text blocks includes reconstructing a table document based on the text blocks with the corresponding coordinates of the text blocks.

7. A computer program product comprising:
one or more computer readable storage media, and program instructions collectively stored on the one or more computer readable storage media, the program instructions comprising:
program instructions to detect characters in a document using an object detection technique;
program instructions to identify positions of the detected characters in the document;
program instructions to calculate probability of character units to be connected;
program instructions to determine semantic connectivity based on the calculated probability;
program instructions to analyze the semantic connectivity among the detected characters based on the positions and semantic connectivity of the characters;
program instructions to recognize text blocks of related characters based on the semantic connectivity analysis; and
program instructions to output the text blocks associated with the related characters.

8. The computer program product of claim 7, further comprising:
program instructions, stored on the one or more computer-readable storage media, to receive the document, including tabular data, for processing, the document being a scanned document.

9. The computer program product of claim 7, wherein program instructions to detect the characters include program instructions to recognize content of the detected characters.

10. The computer program product of claim 7, wherein program instructions to analyze the semantic connectivity includes program instructions to take a detected character as a starting point and program instructions to perform connectivity detection in multiple directions, the connectivity detection being based on a base corpus calculating information entropy gain rate of the connecting characters.

11. The computer program product of claim 7, wherein program instructions to recognize the text blocks include program instructions to perform text content connection based on probability of the content connection of the related characters.

12. The computer program product of claim 7, wherein program instructions to output the text blocks include program instructions to reconstruct a table document based on the text blocks with the corresponding coordinates of the text blocks.

13. A computer system comprising:
one or more computer processors, one or more computer readable storage media, and program instructions stored on the one or more computer readable storage media for execution by at least one of the one or more computer processors, the program instructions comprising:
program instructions to detect characters in a document using an object detection technique;
program instructions to identify positions of the detected characters in the document;
program instructions to calculate probability of character units to be connected;
program instructions to determine semantic connectivity based on the calculated probability;
program instructions to analyze semantic connectivity among the detected characters based on the positions and semantic connectivity of the characters;
program instructions to recognize text blocks of related characters based on the semantic connectivity analysis; and
program instructions to output the text blocks associated with the related characters.

14. The computer system of claim 13, further comprising:
program instructions, stored on the one or more computer-readable storage media, to receive the document, including tabular data, for processing, the document being a scanned document.

15. The computer system of claim 13, wherein program instructions to detect the characters include program instructions to recognize content of the detected characters.

16. The computer system of claim 13, wherein program instructions to analyze the semantic connectivity includes program instructions to take a detected character as a starting point and program instructions to perform connectivity detection in multiple directions, the connectivity detection being based on a base corpus calculating information entropy gain rate of the connecting characters.

17. The computer system of claim 13, wherein program instructions to output the text blocks include program instructions to reconstruct a table document based on the text blocks with the corresponding coordinates of the text blocks.

* * * * *